United States Patent
Bourke et al.

(10) Patent No.: US 9,897,334 B2
(45) Date of Patent: Feb. 20, 2018

(54) WATER HEATER CONTROLLER OR SYSTEM

(75) Inventors: Brendan Vincent Bourke, Rydalmere (AU); Bruce Graham Kemmis, Rydalmere (AU); Stephen Gerrard Wooden, Rydalmere (AU); Yue-Xin Peng, Rydalmere (AU); Charles Harry Finch, Rydalmere (AU)

(73) Assignee: RHEEM AUSTRALIA PTY LIMITED, Rydalmere, NSW (AU)

( * ) Notice: Subject to any disclaimer, the term of this patent is extended or adjusted under 35 U.S.C. 154(b) by 1008 days.

(21) Appl. No.: 14/117,437

(22) PCT Filed: Jun. 1, 2012

(86) PCT No.: PCT/AU2012/000637
§ 371 (c)(1),
(2), (4) Date: Aug. 6, 2014

(87) PCT Pub. No.: WO2012/162763
PCT Pub. Date: Dec. 6, 2012

(65) Prior Publication Data
US 2014/0343888 A1    Nov. 20, 2014

(30) Foreign Application Priority Data
Jun. 3, 2011    (AU) ................................ 2011902196

(51) Int. Cl.
*F24D 11/00* (2006.01)
*F24D 19/10* (2006.01)

(52) U.S. Cl.
CPC ........ *F24D 19/1063* (2013.01); *F24D 11/003* (2013.01); *F24D 11/004* (2013.01);
(Continued)

(58) Field of Classification Search
CPC .. F24D 11/003; F24D 11/004; F24D 19/1063; F24D 19/1009; F24D 19/1048; Y02B 10/70; Y02B 10/20
See application file for complete search history.

(56) References Cited

U.S. PATENT DOCUMENTS

| | | | |
|---|---|---|---|
| 4,568,821 A * | 2/1986 | Boe ................... | G05D 23/1905 219/419 |
| 5,956,462 A | 9/1999 | Langford | |

(Continued)

FOREIGN PATENT DOCUMENTS

| | | |
|---|---|---|
| GB | 2483362 | 3/2012 |
| WO | 2006/045145 | 5/2006 |
| WO | 2006/053386 | 5/2006 |

OTHER PUBLICATIONS

Kim et al., "Formula 1: Heat Energy", May 27, 2005, unknown publisher, pp. 1-2, http://springprojectwhs.tripod.com/id9.html.*

(Continued)

*Primary Examiner* — Mischita Henson
(74) *Attorney, Agent, or Firm* — Whitham, Curtis & Cook, P.C.

(57) ABSTRACT

A method of measuring the amount of energy consumed from a water heater having a tank with two or more temperature sensors located a predetermined heights on or in the tank, the method including the step of; for each sensor, determining a corresponding volume of a segment of the tank, measuring the change of temperature at each temperature sensor, calculating the energy for the corresponding volume for each sensor, and summing the energy changes for all the sensors to determine the amount of energy consumed. The energy usage can be recorded with chronological information to construct a usage pattern which can be used for controlling the heater and for providing the user (Continued)

with details of energy usage. The system does not require the use of data derived from a flow meter.

20 Claims, 5 Drawing Sheets

(52) U.S. Cl.
CPC ..... *F24D 19/1009* (2013.01); *F24D 19/1048* (2013.01); *Y02B 10/20* (2013.01); *Y02B 10/70* (2013.01)

(56) References Cited

U.S. PATENT DOCUMENTS

| | | | |
|---|---|---|---|
| 8,322,313 B2* | 12/2012 | Yamaoka | F24H 1/186 122/14.22 |
| 2009/0234513 A1* | 9/2009 | Wiggins | F24D 19/1051 700/300 |

OTHER PUBLICATIONS

Lutz et al., "WHAM: A Simplified Energy Consumption Equation for Water Heaters", unknown date, unknown publisher, pp. 1.171-1.183, http://aceee.org/files/proceedings/1998/data/papers/0114.PDF.*

Fanney et al., "The Thermal Performance of Residential Electric Water Heaters Subjected to Various Off-Peak Schedules", May 1996, Journal of Solar Energy Energy Engineering, vol. 118, pp. 73-80.*

\* cited by examiner

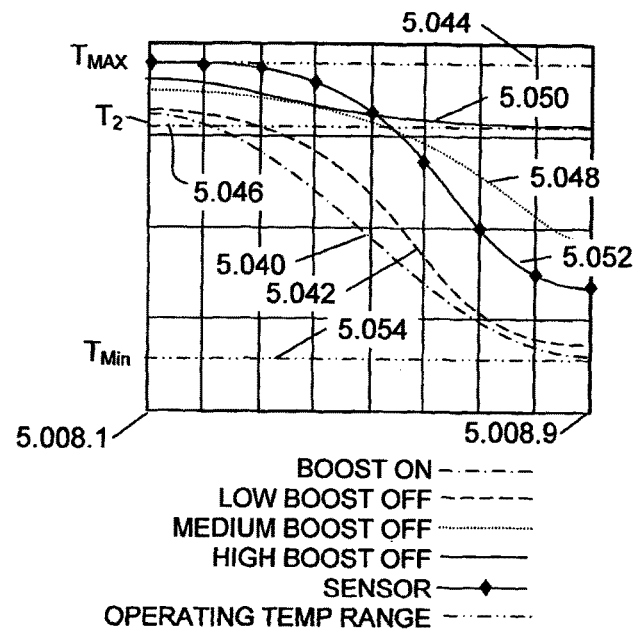
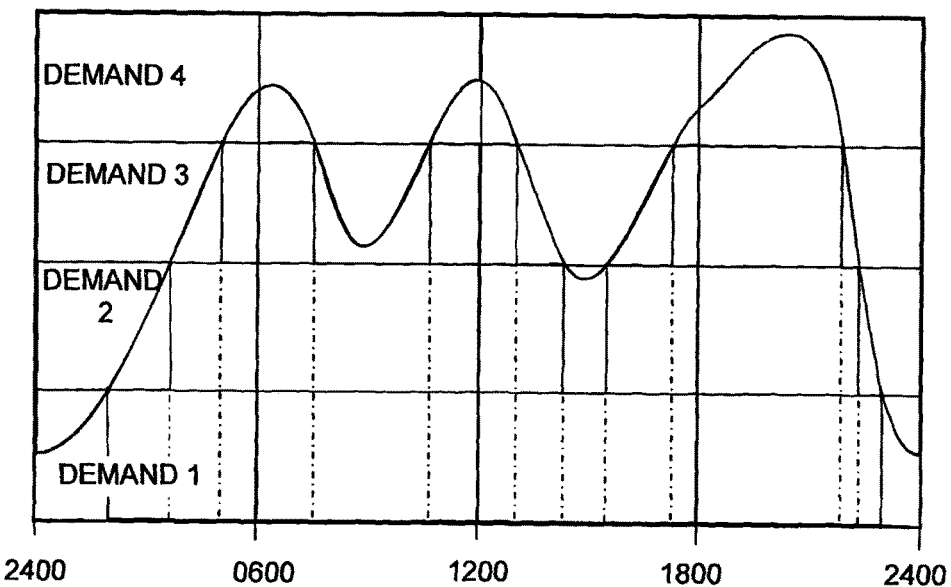

WATER HEATER CONTROLLER OR SYSTEM

FIELD OF THE INVENTION

This invention relates to water heaters, and particularly to the measurement of energy usage or consumption in water heaters.

The invention can be used to measure the energy consumption of storage water heaters generally. The invention can be used in conjunction with electric water heaters, gas water heaters, boosted solar water heaters, and boosted heat pump systems. The invention will be described in relation to dual fuel or boosted water heating systems; but can also be used with single energy source systems to monitor and/or control energy consumption. For example, the system can be used to advantage in an electrically boosted solar water heating system having a storage tank supplied by a water supply, and delivering heated water to users. A solar collector can have one or more panels of risers and headers to absorb solar energy for delivery to the tank. The solar heat energy can be used directly to heat water in the tank, or the solar energy can be used to heat a heat transfer fluid which delivers the heat energy to the water in the tank via a heat exchanger.

The invention can also be used in conjunction with water heating system controllers to measure energy consumption on a time-of-day basis, and this can be used, eg, for heated water demand prediction.

BACKGROUND OF THE INVENTION

Boosted solar water heaters can include a booster heater powered by electricity. A major advantage of solar water heaters is that they substantially reduce the requirement for mains electricity. It is desirable to reduce or minimize use of the booster heater. When heated water is drawn from the tank, an equal volume of unheated water is delivered to the tank from the water supply. If a large demand for hot water occurs when no solar input is available, or if the demand exceeds the rate of reheating available from the solar collector panels, the booster heater is used to replenish the heated water.

AU2005299246 describes a system and method for measuring the volume of hot water consumed by measuring the flow of water through the heater. using a flow meter. To implement this, temperature sensors are fitted to the inlet and outlet of the tank, and a flow meter is required.

A flow meter is an added cost in the manufacture of a water heater. Flow meters have moving parts and require additional installation. Thus, this invention proposes a system for measuring the energy consumption which does not require the use of a flow meter to determine the volume of heated water consumed.

SUMMARY OF THE INVENTION

The invention provides a system and method for determining the amount of heat energy in a tank by measuring the temperature of the water in the tank without the use of data derived from a flow meter. The invention also provides a controller adapted to control water heater.

In one embodiment, the average temperature of the water in the tank can be determined from two or more temperature sensors, and the heat energy calculated from the known volume of the tank and the specific heat of water.

The temperature can be measured at more than one height because the temperature of the water can be gradated or stratified.

The energy can be calculated from the measured temperatures.

The change in energy can be determined from measurements at different times.

The change in energy can be recorded with the time of the change to provide a water usage history.

According to an embodiment of the invention, there is provided a method of calculating an estimate of the amount of heat energy change in a water heater system tank, the method including measuring the temperature of segments of the tank, each segment having a known volume, comparing temperature measurements over time, and calculating the amount of thermal energy change for each segment, and summing the energy changes for all segments.

According to another embodiment of the invention, there is provided a method of measuring the amount of energy consumed from a water heater having a tank with two or more temperature sensors located a predetermined heights on or in the tank, the method including the step of; for each sensor, determining a corresponding volume of a segment of the tank, measuring the change of temperature at each temperature sensor, calculating the energy for the corresponding volume for each sensor, and summing the energy changes for all the sensors to determine the amount of energy consumed.

A further embodiment of the invention includes a controller programmed to operate a water heater according to the methods of the invention.

Sensor readings can be continually monitored.

Sensor readings can be recorded in response to a start event and in response to an end event.

A first temperature measurement from each sensor can be recorded when a change of temperature is detected.

The sensor reading can be recorded when a rate of change of temperature exceeds a predetermined first temperature change rate.

A second temperature measurement can be recorded when the rate of change of temperature is less than a second predetermined temperature change rate.

The temperature measurement can be taken when the temperature of the water in the tank has substantially stabilized.

The change in sensor readings can result from heated water being drawn from the tank.

The change in sensor readings can result from thermal losses from the tank.

The change in temperature can result from heat energy input to the tank.

According to another embodiment of the invention there is provided a water heating system including a heated water storage tank having two or more temperature sensors located at predetermined heights on or in the tank, the location of each sensor being adjacent to or within an associated volume of water in the tank, such that the sensor provides a practical measurement of the temperature of the water in the associated volume, the system including a processor responsive to the readings from the sensors and their associated volumes to calculate an amount of energy resulting from changes in the sensor readings.

The system can include a store associated with the processor, whereby the processor can store energy consumption information.

The processor can store chronological information associated with energy consumption information.

According to an embodiment of the invention, there is provided a hot water system including:
a water storage tank;
a means of heating water in or delivered to the tank;
two or more temperature sensors measuring water temperature at predetermined locations within the tank;
an electronic controller in communication with the temperature sensors and configured to measure thermal energy stored in the tank and to calculate the amount of thermal energy transferred into and out of the tank.

The temperature sensors can be an array of sensors, each sensor corresponding to predetermined volumes of water within segments of the tank.

The temperature sensors can be mounted on the surfaces of the tank.

The temperature sensors can be mounted in the tank.

The controller can store information derived from the sensor measurements so as to retain a record and subsequently use this record, in conjunction with current, ie, contemporaneous, measurements and other information about the system to initiate a water heating cycle to meet a predicted future use.

Information specific to the water heater can be programmed into the controller.

The information specific to the water heater can include the volume of the tank, the mass of water, the power of the heater element or heat output of a burner or heat pump, tank heat loss rate, and other information relevant to the operation and performance of the system.

The controller can output these measurements for use by an information display device.

The invention also provides a flow-meter-less system and or method and or controller as described above.

BRIEF DESCRIPTION OF THE DRAWINGS

An embodiment or embodiments of the present invention will now be described, by way of example only, with reference to the accompanying drawings, in which:

FIG. 5 shows a gas boosted solar water heater according to an embodiment of the invention.

FIG. 6 shows an illustrative daily usage pattern.

Figure 1:
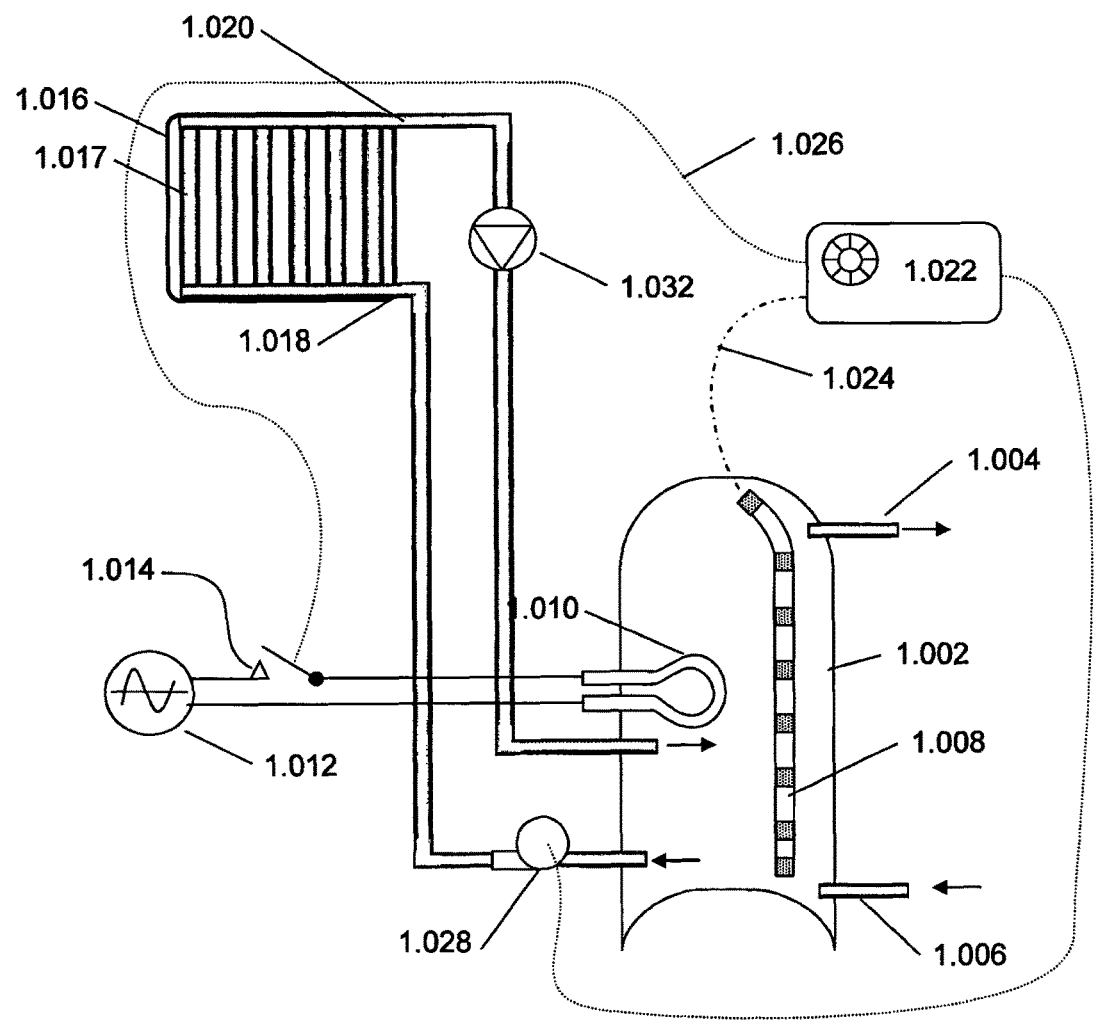
FIG. 1 is a schematic illustration of the relevant elements of a solar split water heating system according to an embodiment of the invention.

The numbering convention used in the drawings is that the digits in front of the full stop indicate the drawing number, and the digits after the full stop are the element reference numbers. Where possible, the same element reference number is used in different drawings to indicate corresponding elements.

The orientation of the drawings may be chosen to illustrate features of the embodiment of the invention, and should not be considered as a limitation on the orientation of the invention in use.

It is understood that, unless indicated otherwise, the drawings are intended to be illustrative rather than exact representations, and are not necessarily drawn to scale. The orientation of the drawings is chosen to illustrate the features of the objects shown, and does not necessarily represent the orientation of the objects in use.

DETAILED DESCRIPTION OF THE EMBODIMENT OR EMBODIMENTS

The invention will be described with reference to the accompanying drawings.

The invention, at its most basic, utilizes the average temperatures before and after a change in tank energy (ie, input or outtake) and the known volume of the tank to calculate the change in energy in the water in the tank. An embodiment of the invention provides a tank with a number of temperature sensors at different heights and the notional allocation of an adjacent segment of the tank volume to each temperature sensor. From this either the average temperature of the water can be calculated so the energy in the whole tank can be calculated directly using the average temperature, or the energy of the water in each segment can be calculated so the total energy in the water can be calculated.

A system embodying the invention measures the temperature of the water in the tank and then calculates the heat energy of the water in the tank.

The system can also determine the difference in heat energy in the tank at different times or following identifiable events, such as the start and end of heated water being used.

A number of temperature sensors can be located to measure the temperature of the water at different heights in the tank.

A log of the temperatures from each sensor recorded against time can be maintained so thermal events such as use of hot water or activation of a heater can be identified. The energy differential for these events can also be calculated.

The system can differentiate between thermal leakage and energy withdrawn from the tank by the use of hot water, and can also distinguish the input of heat energy into the tank.

FIG. 1 shows a split solar water heating system having a roof mounted solar collector 1.016, and a storage tank 1.002, usually mounted within a building. The tank can have a water supply inlet 1.006 and a heated water delivery outlet 1.004.

Figure 2:
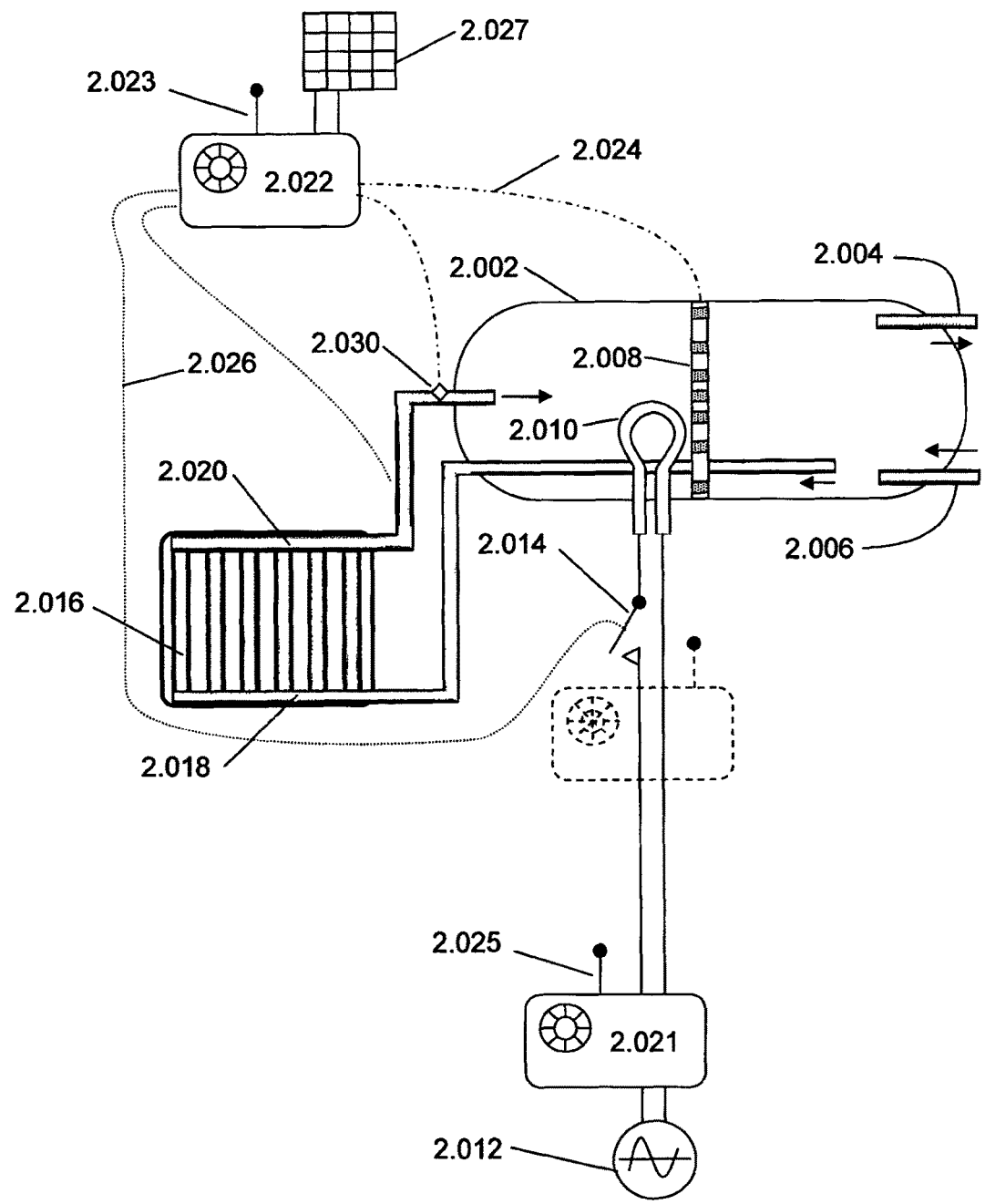
FIG. 2 is a schematic illustration of the relevant elements of a roof mounted solar water heating system according to an embodiment of the invention.

The solar heating system can be a direct system in which the potable water in the storage tank is directly heated in the solar collector, or it may be an indirect system in which an intermediate heat transfer fluid is heated in the collector and wherein the heat energy is transferred to the potable water in the tank via a heat exchanger. The system illustrated in FIGS. 1 and 2 is a direct system.

The collector may have riser pipes 1.017 with an upper heated water header 1.020 from which heated water is delivered to an intermediate or upper portion of tank 1.022, and a lower intake header 1.018 which receives water from the lower portion of tank 1.002. The heated water header 1.020 is higher than the intake header 1.018 so the heated water will rise to the upper header 1.020. A pump 1.028 pumps the water through the collector and tank.

A one way valve or a temperature controlled valve 1.032 can be provided to prevent reverse thermosyphoning when the water in the collector header is cooler than the water in the tank.

A processor, such as controller 1.002, is provided to calculate energy consumption.

The invention uses a number of temperature sensors at predetermined locations on or in the tank to measure the temperature of the water in the tank at the predetermined locations. A plurality of temperature sensors can be provided on a flexible PCB strip, as described in our published PCT patent application number WO2006053386, which is incorporated herein by reference. The thermo-sensor strip is mounted against the external wall of the tank, between the tank wall and the tank insulation so it measures the temperature of the adjacent tank wall which is heated by the water in the tank. The volume of water in the tank is always full as it is constantly replenished from the water supply.

The temperature sensors can be evenly spaced along the height of the tank, so that each sensor provides an approximate average temperature reading for an equal volume of water, ignoring end effects of the tank. That is, each sensor can provide an average temperature reading for an cylindrical segment of the water in the tank, having a height which is intermediate the sensor and the upper and lower adjacent sensors. Thus, the thermal energy content of each segment of the tank can be calculated.

In case the sensors are not located such that each sensor reports the temperature of an equal volume, then, provided the adjacent volume of each sensor intermediate its adjacent sensors is known, the calculation can take the differing volumes into account.

Furthermore, where there has been a change in temperature of at least some segments of the tank, the amount of energy drawn off can be calculated from the difference in the temperature readings of each segment's sensor before and after the water was drawn off. Mathematically, this can be expressed as:

$$Q = M_n \cdot C_p \cdot \Delta T \qquad \text{Equation 1}$$

where Q=energy in MJ, $M_n$=mass of water in segment "n" in kg, $C_p$=specific heat in kJ/kg K, and $\Delta T_n$=temperature change ° C. for segment "n".

The total energy drawn off is:

$$Q_\Sigma = \Sigma^N_{n=1}(M_n \cdot C_p \cdot \Delta T_n) \qquad \text{Equation 2}$$

where N is the number of segments.

That is, the total energy in the water drawn off can be determined by summing the energy changes for each segment based on the volume of each segment and the corresponding temperature change of the segment.

For a boosted solar water heater system, an electrical heating element 1.010 is provided in the tank. The booster heater can be connected to an electrical supply 1.012 via switch 1.014. The switch can be controlled by controller 1.022.

Depending on the required performance of the booster heater, the element can be placed at a height in the tank to provide the required performance. For example, for faster reheating, the element can be placed nearer the top of the tank to rapidly heat the volume of water above the heating element.

In order to minimize the energy requirement of the booster heater, the controller can utilize the consumption information derived from the temperature changes detected by the sensor strip 1.008.

Thus the controller 1.022 can determine the both the energy content of the water in the tank and energy usage.

The controller 1.022 can also be adapted to maintain a chronological time-of-day consumption record and can record usage against the time, day of the week and date. This information can be used to determine usage patterns. For example, the controller can store the usage history by day and date and establish usage patterns for different days of the week, as well as for different times of year.

The thermal output of the booster heater 1.010 can be recorded in the controller to enable the controller to calculate the time required to bring the water to a required temperature. This can be used to determine the time required to boost the temperature of the water in order to meet the expected demand for hot water.

FIG. 2 schematically illustrates a roof-mounted solar water heating system. The tank 2.002 is mounted higher than the upper heated manifold 2.020 as this permits the use of thermosyphoning to circulate the water or heat transfer fluid from the solar collector.

An electric booster heater 2.010 is controlled by controller 2.022 via switch 2.014. The switch can be mounted with the tank. The controller 2.022 can be a roof mounted device mounted with the roof-mounted water heating system. Optionally it can be powered by a solar photovoltaic power supply 2.027 which can incorporate an electric storage cell. Alternatively, the controller can be connected to the mains electricity supply 2.012 on the mains side of switch 2.014 (dashed outline), so it remains powered when the switch is in the open circuit state.

The controller 2.022 can include a wireless communication link with antenna 2.023 to enable communication with a second controller 2.021. The roof mounted controller can also send its readings from the sensors to the second controller 2.021.

A thermo-sensor strip 2.008 can be used to measure the temperature within the tank. The sensors can be located at evenly spaced intervals. However, in this embodiment, the sensors are spaced to measure the temperature of equal volumes of water, as shown in FIG. 3.

Figure 3:
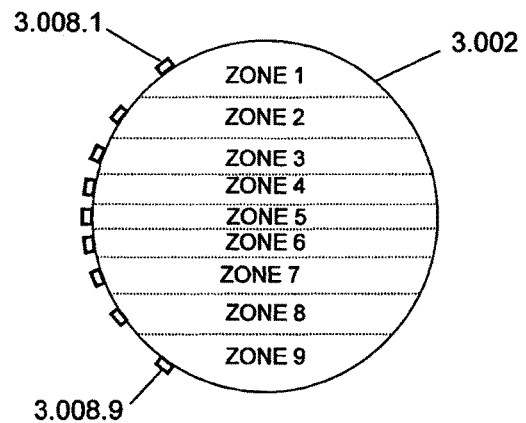
FIG. 3 is a schematic cross-section of a tank of a roof mounted water heating system according to an embodiment of the invention.

FIG. 3 schematically illustrates a cross-section of a horizontally oriented tank 3.002 with a plurality of temperature sensors 3.008.1 to 3.008.9 located at various positions on the tank wall. Each sensor is adjacent a corresponding imaginary horizontal zone of the tank. Thus, for example, sensor 3.008.1 is adjacent zone 1, and sensor 3.008.9 is adjacent zone 9. The zones are selected so that each corresponding sensor is measures the temperature of an equal volume of water. That is, the cross-sectional area of each section is the same, assuming a cylindrical tank. However, as the tank can have curved ends, the cross-section of the zones can be adjusted to allow for this difference.

The borders between the zones can be defined, for example, as the horizontal plane through the circumferential mid-point between adjacent sensors. The zone with the smallest height is the zone enclosing or abutting the centre of the tank cross-section, as this has the greatest width. The heights of the zones increase moving upward or downward from the centre zone to compensate for the decreasing width of the zones.

While nine sensors and zones are shown, more or fewer sensors and zones can be used in other embodiments of the invention.

While the embodiment of FIGS. 2 & 3 describes the sensors as being allocated to equal sized zones. This is not essential to the invention. Provided the volume allocated to each sensor is known, the energy calculation can still be carried out.

Figure 4:
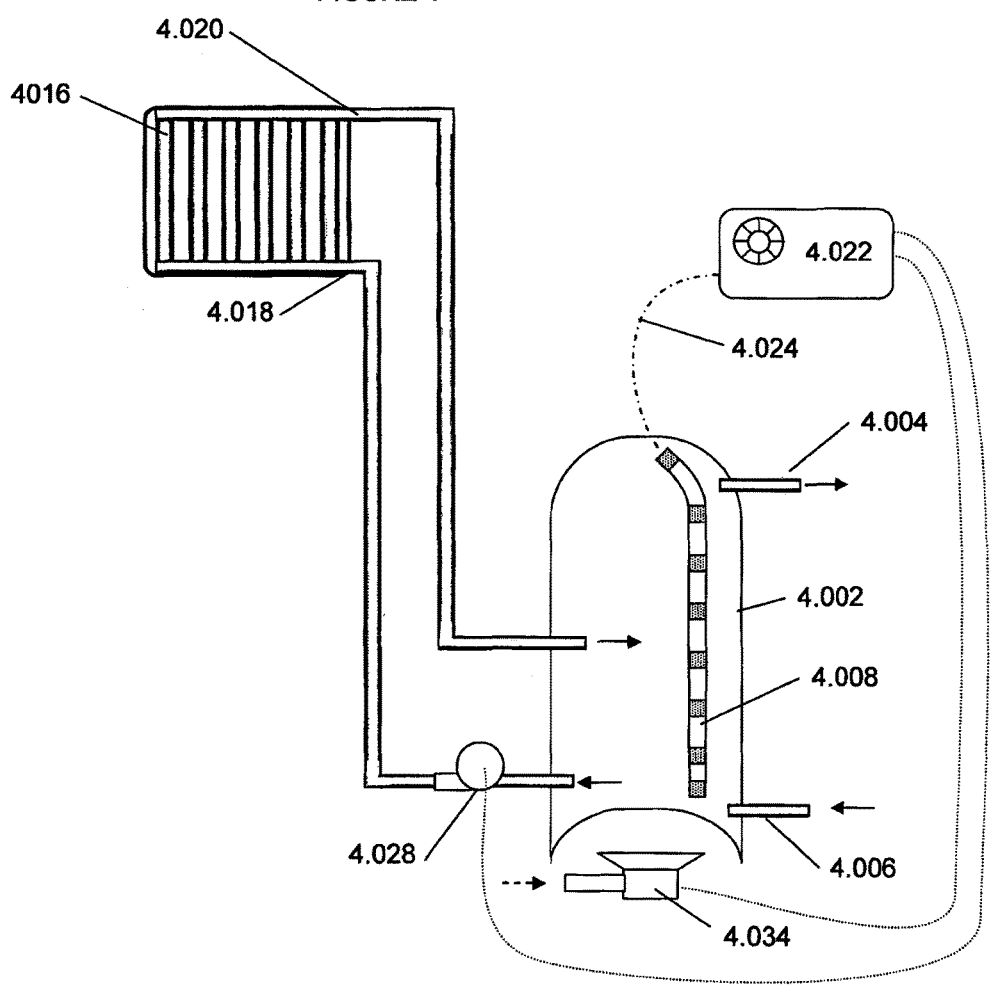
FIG. 4 shows a temperature chart against which the temperature sensors of the tank of FIG. 3 can be plotted.

FIG. 4 illustrates a solar water heater system with gas boost. The system is similar to that of FIG. 1, with the electric booster 1.010 replaced by a gas heater 4.034. The thermal output of the gas heater can be recorded in the controller to enable the controller to calculate the time required to bring the water to a required temperature.

The system can use all the sensors to determine the total energy of the water in the tank. Each sensor monitors the temperature of its allotted volume segment. The controller can then calculate the energy in each segment and then calculate the total energy in the tank by adding the energies of the individual segments. The sum of the heat energies can be used to maintain a minimum heat energy when there is no anticipated usage load. This can be done by switching the heater on or off as indicated by the sensor readings. The minimum level can be preset by the user inputting the required temperature into the controller. The controller can be programmed to use the usage history to anticipate upcoming demand for hot water and raise the temperature in advance of the expected time of the upcoming usage. The user can also be enabled to modify the operating timetable when changes in the historical usage pattern are planned.

Of course the person skilled in this field will readily understand that the temperature sensor readings can be used in alternative methods to calculate the energy of the water in the tank. For example, total energy can also be calculated from the sensor readings by determining the average temperature of the water in the tank, and then calculating the energy of the whole volume of water in the tank.

Where the sensors monitor equal volumes, the average temperature can be calculated by summing the temperatures of each sensor and dividing by the number of sensors.

Where the volumes monitored by each sensor are not all equal, the product of the temperature and volume for each sensor can be summed and divided by the tank volume to provide the average temperature. However, this method involves redundant calculation because the temperature/volume calculation for each segment is effectively the calculation of the segment energy, and is not the preferred method.

The heat energy values are derived from the sensors. The controller is programmed to implement an algorithm to initiate boost to maintain the preset energy level and raise the temperature in anticipation of a usage of hot water.

Total heat energy in the tank is governed by the thermostat setting.

Using equations 1 & 2, the amount of energy consumed can be calculated and recorded against the time-of-day, day-of-week, date so a usage history can be recorded as shown by way of illustrative example in FIG. 6.

The usage pattern of FIG. 6 illustrates a daily demand with three peaks. The data for such a demand plot can be used to identify typical periods of low and high usage. The controller can use the usage patterns to predict the upcoming loads and can thus operate the heater system to meet the upcoming demand while minimizing energy input, by, for example, maintaining the temperature of the water in the tank at a first temperature when the load is predicted to be nil, maintaining a first portion of the water in the tank within the required operating range, maintaining a second and larger portion of the tank contents within the operating range when moderate, and maintaining the temperature of the water in the tank within the operating range when heavy demand is predicted. Thus, knowing the present state of the water in the tank, and knowing the input capability of the booster, the controller can calculate how long it will take to bring the water to the required temperature and start heating the water to the required temperature before the demand occurs based on the time to bring the water to the operating temperature and the expected demand start time.

For example, a domestic water heating system where all occupants are absent from the house during the day may have a peak in the morning and a second peak in the evening, but may have little or no demand between these times.

In contrast, a commercial water heating system may have a demand pattern with peaks during the day.

A further example would be the replacement of heat loss from the tank, for example, overnight, at a time satisfying an anticipated usage pattern.

Figure 7:
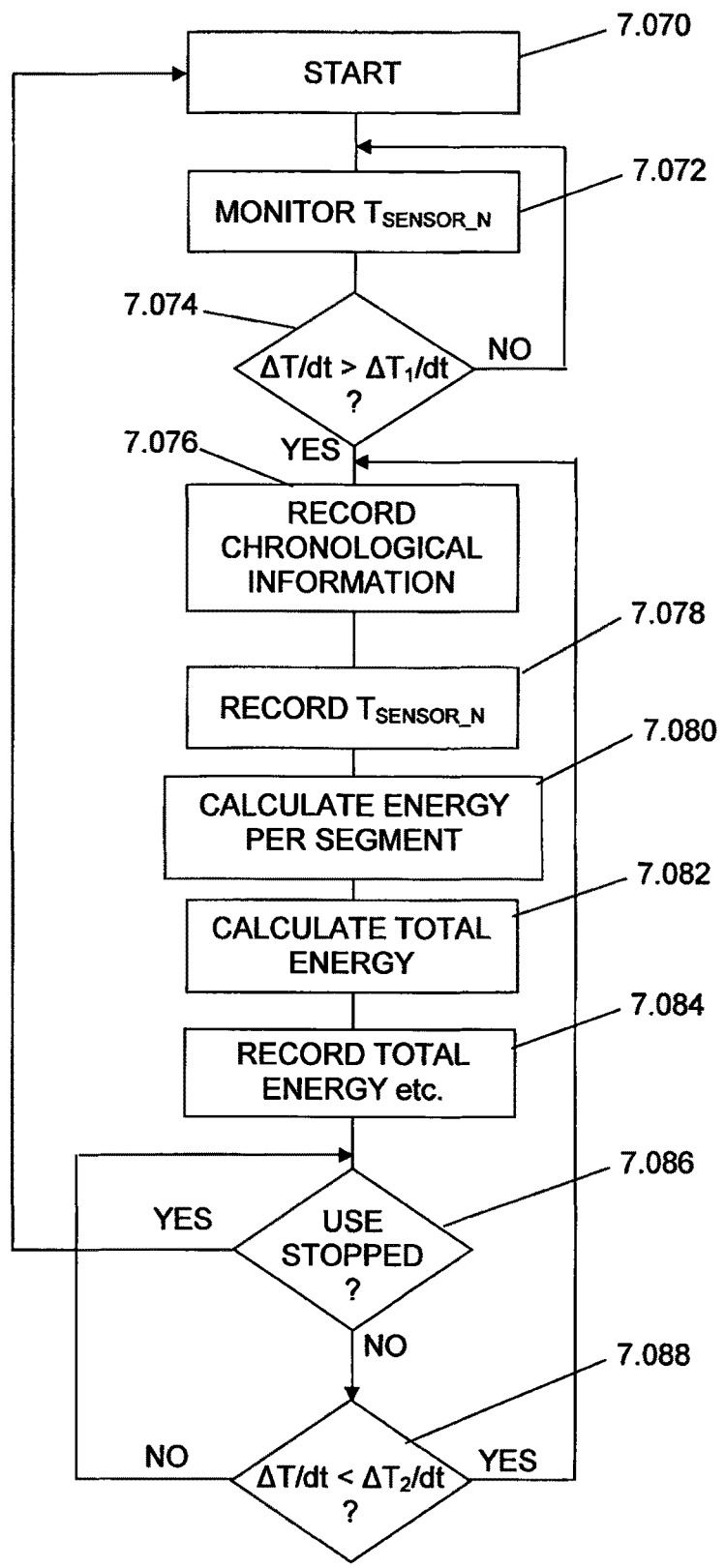
FIG. 7 shows an exemplary flow diagram illustrating the main steps of a method of recording data when water is drawn from the tank according to an embodiment of the invention.

FIG. 7 shows an exemplary flow chart illustrating a possible method of generating a usage pattern information according to an embodiment of the invention.

Because heat can leak from the system even when there is no use of hot water, it may be desirable to distinguish between temperature changes due to system losses and demand for hot water. When hot water is drawn from the upper portion of the tank, cold water is delivered to the lower portion of the tank, and the unheated water level will rise up within the tank, so the sensors, from the lowest sensor up, will progressively register a rapid temperature change while hot water is drawn from the tank. Accordingly, the system can be programmed to monitor the temperature at each sensor at 7.072 and to compare the rate of change of temperature with a first predetermined rate of change of temperature $\Delta T_1/dt$ at 7.074 to distinguish between the natural losses and actual usage. $\Delta T_1$ can be equal to or greater then the system loss rate. Where the loss rate. If no use is detected, the processor continues to monitor the sensors.

When the rate of change of temperature indicates that water is being drawn off, the processor registers the time at which this usage commenced at 7.076, and records the temperatures from each sensor at 7.078. The temperatures from the sensors are then used to calculate the current energy in each sensor's segment at 7.080, and the segment energies are summed at 7.082 to provide the total heat energy at the start of the use of water. The initial heat energy in the tank is recorded at 7.084. The processor then checks whether the usage has stopped at 7.086. This can be done using the step 7.088 to determine if the change of temperature is less than a second predetermined temperature change rate $\Delta T_2/dt$, and since the test at 7.088 is carried out after the first pass through 7.086, the processor will first record the chronological data (7.076) and temperature data (7.078, 7.080, 7.082), and compile usage patterns from this information at 7.084 before the process is reset at 7.086. If the usage has not stopped, the processor will continue checking at 7.088 until use stops.

A similar method can be used to measure input energy. The temperature/time change will be in the opposite sense. When the flow from the solar collector is shut off, the input energy will be attributable to the booster heater.

The use of spaced temperature sensors also enables other energy saving modes of operation, such as partial heating of the water in the tank, in which the upper sensors can be used to select a portion of the tank in which the water is to be maintained within an operating temperature range, as disclosed in our copending Australian patent application AU2005294105. FIG. 5 is a temperature chart showing a possible alternative mode of operating a water heater using the temperature sensors and controller of the present invention. In particular, the operating mode could be used to heat only an upper portion of the tank to operating temperature. This mode could be derived from the historical data records or it could be programmed by the user, for example when the number of users of the hot water system changes. In the figure, only the first and last of the temperature sensors 5.008.1 to 5.008.9 are indicated along the abscissa to avoid clutter in the drawing. This chart shows booster trigger points for turning the booster on or off. This is used in conjunction with the usage pattern to minimize the energy consumption.

The line 5.052 represents the temperature of the water in the tank derived from the temperature sensors.

The controller can be programmed to maintain a minimum predetermined heat energy value by supplying and removing power to the heater when there is no anticipated usage of hot water. The user can adjust this minimum value.

As the time of an expected usage approaches, the temperature and stored energy are raised in anticipation of the expected load.

The dash-dot-dot lines 5.044, 5.046 show the desired output temperature range. Thus, when the heater is in use, at least the top segment (ZONE 1 in FIG. 3) should be maintained within this range as the heated water outlet (eg, 2.004 FIG. 2) is drawn from this zone.

The curve 5.052 represents an example of the sensor readings at a particular stage of usage.

The curve 5.040 indicates a minimum temperature to be maintained against each sensor. If the temperature of a sensor falls below this line, the booster heater can be turned on unless the usage pattern indicates that there is negligible demand at the time, or when the heating system has been switched to a stand-by mode by the user, for example when the building is to be vacant for some time.

Thus, the historical data of the total energy of the tank, derived from the temperature sensors can be used to determine when to initiate heating in anticipation of expected usage, while the temperature sensors can be used in real time to select a portion of the tank to be heated if it is not desired to heat the whole tank.

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise. These terms will normally refer to orientations shown in the drawings.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A water heating system having:
    a tank;
    two or more temperature sensors, each located at predetermined heights on or in the tank;
    a heating arrangement for heating water in the tank; and
    a controller adapted to control said heating arrangement:
    wherein the controller is adapted to determine an energy consumption in said tank to control an operation of said heating arrangement, by the following steps:
    for each sensor, allocating a volume of a corresponding segment of the tank;
    measuring a change of temperature at each temperature sensor wherein said change of temperature at each temperature sensor is recorded in response to a start event and in response to an end event;
    calculating energy for the corresponding volume for each sensor; and
    summing energy changes for all the sensors to determine the amount of energy consumed;
    whereby said controller controls said heating arrangement to produce an energy input to said tank to replace an amount of energy consumed.

2. The water heating system as claimed in claim 1, wherein the controller continually monitors sensor readings.

3. The water heating system as claimed in claim 1, wherein a first temperature measurement is recorded from each sensor when a change in temperature at one of the sensors is detected.

4. The water heating system as claimed in claim 1, wherein the sensor reading is recorded when a rate of change of temperature exceeds a predetermined first temperature change rate.

5. The water heating system as claimed in claim 3, wherein a second temperature measurement is recorded when the rate of change of temperature is less than a second predetermined temperature change rate.

6. A method of regulating energy in heated water in a water heating apparatus in a manner independent of flow of water through said water heating apparatus, said water heating apparatus comprising:
    a tank to hold heated water including two or more temperature sensors each located at predetermined, spatially separated heights on or in the tank;
    a heating arrangement for heating water in the tank; and
    a controller adapted to control said heating arrangement in accordance with changes in computed energy of said heated water in said tank, said method comprising:
    for each sensor, allocating a volume of a corresponding segment of the tank; and
    measuring a change of temperature at each temperature sensor wherein said change of temperature at each temperature sensor is recorded in response to a start event and in response to an end event;
    configuring said controller to perform steps of:
    calculating energy of each said corresponding volume for each said sensor;
    approximating energy changes in each said corresponding volume for each said sensor;
    summing energy changes resulting from said approximating step for all the sensors to determine the amount of energy transferred from said tank; and
    controlling operation of said heating arrangement to increase total energy in said heated water in said tank by an amount substantially equal to said energy changes resulting from said summing step;
    whereby said controller controls said heating arrangement to produce an energy input to said tank to replace an amount of energy consumed.

7. The method as recited in claim 6 wherein the controller continually monitors sensor readings.

8. The method as recited in claim 6, wherein sensor readings are recorded in response to a start event and in response to an end event.

9. The method as recited in claim 8, wherein a first temperature measurement is recorded from each sensor when a change in temperature at one of the sensors is detected.

10. The method as recited in claim 9, wherein the sensor reading is recorded when a rate of change of temperature exceeds a predetermined first temperature change rate.

11. The method as claimed in claim 10, wherein a second temperature measurement is recorded when the rate of change of temperature is less than a second predetermined temperature change rate.

12. The method as recited in claim 6, wherein the controller is further adapted to record chronological data for energy consumption information together with the calculated energy consumption.

13. The method as recited in claim 12, wherein said controller is adapted to determine a usage pattern from the energy consumption information and the chronological information.

14. The method as recited in claim 13, wherein said controller controls said heating arrangement to start heating water earlier than an anticipated usage start time.

15. The method as recited in claim 6, wherein said heating arrangement includes a solar energy collecting panel and a booster heater.

16. The method as recited in claim 15, wherein said solar collecting panel transfers heat to said water by a heat transfer fluid.

17. A water heating system having:
a tank;
two or more temperature sensors, each located at predetermined heights on or in the tank;
a heating arrangement for heating water in the tank; and
a controller adapted to control said heating arrangement:
wherein the controller is adapted to determine an energy consumption in said tank to control an operation of said heating arrangement, by the following steps:
for each sensor, allocating a volume of a corresponding segment of the tank;
measuring a change of temperature at each temperature sensor;
calculating energy for the corresponding volume for each sensor; and
summing energy changes for all the sensors to determine the amount of energy consumed;
whereby said controller controls said heating arrangement to produce an energy input to said tank to replace an amount of energy consumed; and
wherein the controller is further adapted to record chronological data for energy consumption information together with the calculated energy consumption.

18. The water heating system as claimed in claim 17, wherein said controller is adapted to determine usage pattern from the energy consumption information and the chronological information.

19. The water heating system as claimed in claim 17, wherein said controller controls said heating arrangement to start heating water earlier than an anticipated usage start time.

20. A method of regulating energy in heated water in a water heating apparatus in a manner independent of flow of water through said water heating apparatus, said water heating apparatus comprising:
a tank to hold heated water including two or more temperature sensors each located at predetermined, spatially separated heights on or in the tank;
a heating arrangement for heating water in the tank; and
a controller adapted to control said heating arrangement in accordance with changes in computed energy of said heated water in said tank, said method comprising:
for each sensor, allocating a volume of a corresponding segment of the tank; and
measuring a change of temperature at each temperature sensor;
configuring said controller to perform steps of:
calculating energy of each said corresponding volume for each said sensor;
approximating energy changes in each said corresponding volume for each said sensor;
summing energy changes resulting from said approximating step for all the sensors to determine the amount of energy transferred from said tank; and
controlling operation of said heating arrangement to increase total energy in said heated water in said tank by an amount substantially equal to said energy changes resulting from said summing step;
whereby said controller controls said heating arrangement to produce an energy input to said tank to replace an amount of energy consumed; and
wherein the controller is further adapted to record chronological data for energy consumption information together with the calculated energy consumption.

* * * * *